(12) United States Patent
Linnenbrock

(10) Patent No.: US 8,814,519 B2
(45) Date of Patent: Aug. 26, 2014

(54) FAN, METHOD FOR ASSEMBLING A FAN WHEEL AND DEVICE

(75) Inventor: Klaus Linnenbrock, Changsha (CN)

(73) Assignee: Robert Bosch GmbH, Stuttgart (DE)

( * ) Notice: Subject to any disclaimer, the term of this patent is extended or adjusted under 35 U.S.C. 154(b) by 784 days.

(21) Appl. No.: 13/127,357

(22) PCT Filed: Sep. 3, 2009

(86) PCT No.: PCT/EP2009/061384
§ 371 (c)(1),
(2), (4) Date: Jul. 29, 2011

(87) PCT Pub. No.: WO2010/060658
PCT Pub. Date: Jun. 3, 2010

(65) Prior Publication Data
US 2011/0274557 A1    Nov. 10, 2011

(30) Foreign Application Priority Data
Nov. 3, 2008  (DE) .................... 10 2008 043 403

(51) Int. Cl.
F04D 29/36    (2006.01)
F04D 29/26    (2006.01)
F04D 29/66    (2006.01)

(52) U.S. Cl.
CPC ............ F04D 29/263 (2013.01); F04D 29/662 (2013.01)
USPC .......................................... 416/148; 464/23

(58) Field of Classification Search
CPC .......... F01D 5/025; F01D 5/027; F01D 5/10; F01D 25/04; F01D 25/06; F04D 29/662; F05D 2230/64; F05D 2230/644; G01M 1/36

USPC ........ 415/119; 416/61, 140, 148, 149, 204 R, 416/205, 244 R, 246, 248, 500; 464/23; 403/335, 337
See application file for complete search history.

(56) References Cited

U.S. PATENT DOCUMENTS

| | | | |
|---|---|---|---|
| 3,492,894 A | 2/1970 | Hahn et al. | |
| 4,003,265 A * | 1/1977 | Craig et al. | ............... 74/5 R |
| 6,527,516 B2 | 3/2003 | Crevel | |
| 6,908,284 B2 | 6/2005 | Adrian | |
| 7,008,191 B2 | 3/2006 | Billington | |
| 2011/0211663 A1 | 9/2011 | Yaita et al. | |

FOREIGN PATENT DOCUMENTS

| | | |
|---|---|---|
| EP | 0962660 A1 | 12/1999 |
| JP | 10131890 | 5/1998 |

OTHER PUBLICATIONS

PCT/EP2009/061384 International Search Report.

* cited by examiner

*Primary Examiner* — Edward Look
*Assistant Examiner* — Aaron R Eastman
(74) *Attorney, Agent, or Firm* — Michael Best & Friedrich LLP

(57) ABSTRACT

The present invention relates to a fan, to a method, and to a device for assembling the fan. The fan has an axis of rotation, which is connected to a dog, wherein the dog is connected to a fan wheel, wherein the dog, in a first number of contact surfaces, is in contact with additional contact surfaces of the fan wheel, wherein the dog and/or the fan wheel have more than the first number of contact surfaces and/or additional contact surfaces, wherein at least two contact surfaces have different height positions with respect to a central axis of the dog and/or the fan wheel.

18 Claims, 5 Drawing Sheets

FAN, METHOD FOR ASSEMBLING A FAN WHEEL AND DEVICE

BACKGROUND OF THE INVENTION

The invention refers to a fan with a driving dog and a fan wheel, to a method for assembling the fan wheel, and to a device for implementing the method.

A fan with a fan mounting with a dynamic unbalance weight is known from international patent application WO03/040570 A1. The described axial fan has a hub region for connecting the axial fan to a drive shaft of an electric drive, wherein the axial fan is statically balanced by means of a balance weight. A flexible connection is formed in the hub region between the axial fan and the drive shaft of an electric drive.

The occurrence of unbalance in a fan constitutes a problem particularly in the case of high-speed fans.

SUMMARY OF THE INVENTION

The object of the invention is to provide a fan, a method for assembling a fan, and a device for implementing the method, wherein a reduction of the unbalance of the fan can be achieved.

One advantage of the fan is that the driving dog and/or the fan wheel has or have a plurality of contact surfaces, wherein the contact surfaces have different height positions with regard to a center axis of the driving dog or of the fan wheel, and wherein the driving dog butts against the fan wheel by a fixed number of contact surfaces so that the unbalance, especially the dynamic unbalance, is reduced. Therefore, a two-plane unbalance can be reduced.

The method according to the invention for assembling the fan wheel with the driving dog has the advantage that an optimized height position between driving dog and fan wheel is created by means of a plurality of contact surfaces which have different height positions with regard to a center plane of the driving dog and/or to a center plane of the fan wheel. For this, different positions, i.e. different pairings of contact surfaces between driving dog and fan wheel are set, a level for the unbalance is measured, and the driving dog is fixedly connected to the fan wheel in the position in which the lowest unbalance occurs. Therefore, by means of the provided contact surfaces at different heights, an inclined position of the fan wheel with regard to a rotational axis or an unbalance, particularly a dynamic unbalance, of the fan wheel can be reduced.

The device according to the invention has the advantage that provision is made for a fixing bolt which fixes the fan wheel and the driving dog symmetrically in relation to each other, that provision is made for pressing-on means with which the fan can be pressed onto the driving dog in different angular positions. In this way, the method for determining an optimized angular position can be implemented without a screw fastening of the driving dog to the fan wheel being necessary.

Depending upon the selected embodiment, at least two contact surfaces of the driving dog have different height positions with regard to a center plane of the driving dog, wherein the contact surfaces of the fan wheel are arranged in one height position with regard to a center plane of the fan wheel.

In a further embodiment, the contact surfaces of the fan wheel are arranged in at least two different height positions with regard to a center plane of the fan wheel, wherein the contact surfaces of the driving dog are arranged at one height position with regard to the center axis of the driving dog.

Depending upon the selected embodiment, both the contact surfaces of the fan wheel and the contact surfaces of the driving dog can be arranged at at least two different height positions with regard to the corresponding center planes.

In a further embodiment, the driving dog and/or the fan wheel has or have groups of contact surfaces, wherein the groups have fixed angular spacings with regard to a center of the fan wheel. Each group has a plurality of contact surfaces, wherein the contact surfaces of a group are arranged in a row with fixed angular spacings. The contact surfaces of a group are arranged at a fixed radial distance from the middle of the fan wheel. In this way, provision is made for a large number of systematically arranged contact surfaces which allow a simple and quick selection of the contact angle between the fan wheel and the driving dog.

In a further embodiment, the contact surfaces of a group are arranged at at least two different height positions with regard to the center plane of the driving dog or the center plane of the fan wheel.

DETAILED DESCRIPTION

Figure 1:
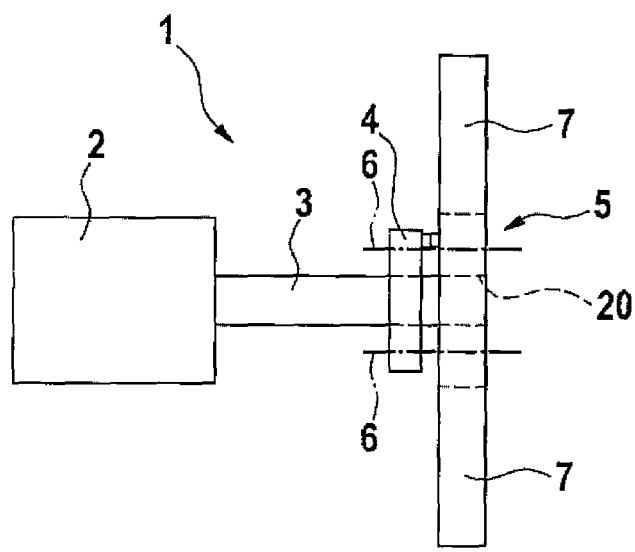
FIG. 1 shows a schematic view of a fan.

FIG. 1 shows in a schematic view a fan 1 with a drive 2 which has a drive shaft 3. The drive shaft 3 is connected to a driving dog 4 in the form of a disk. The driving dog 4 may also be of a three-legged design or have any other form. The driving dog 4 is connected to the drive shaft 3 in a rotation-resistant manner at least in one rotational direction. A fan wheel 5 is fastened on a front side of the driving dog 4. For example, the driving dog 4 has a central opening through which the drive shaft 3 is guided. The driving dog 4 can be connected to the drive shaft 3 via a press fit. Moreover, the fan wheel 5 can also have a central opening 20 into which the drive shaft 3 protrudes. In this way, both the driving dog 4 and the fan wheel 5 are aligned axially on a rotational axis which corresponds to the drive shaft.

Depending upon the selected embodiment, however, only the driving dog 4 may be connected directly to the drive shaft 3. For fastening the fan wheel 5 on the driving dog 4, provision is made for fastening means 6, for example in the form of screws. Other types of fastening means, however, such as adhesive means, can also be used in order to connect the fan wheel 5 to the driving dog 4.

The fan wheel 5 has a fan hub 6, on the outer side of which fan vanes 7 are formed.

For avoiding unbalance, it is necessary for the fan wheel 5 to be fastened on the driving dog 4 in a plane perpendicular to the longitudinal axis of the drive shaft 3. For this, the driving dog 4 and the fan wheel 5 have defined contact surfaces.

In a further embodiment, the fan wheel 5 is fastened for example by a driving dog 4 on a rotor of a brushless external-rotor motor. In this case, the fan wheel 5 can also be fastened directly on the rotor.

Figure 2:
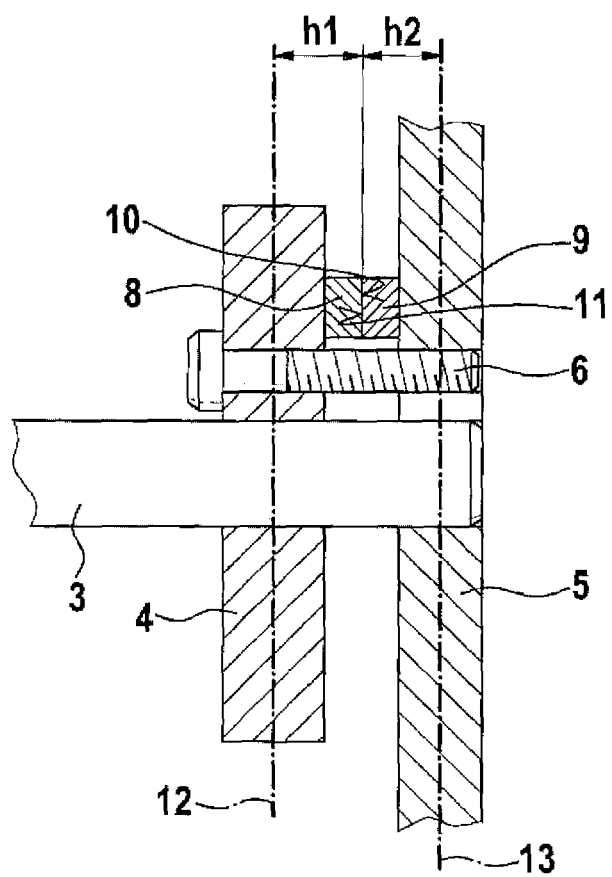
FIG. 2 shows a cross section through a part of the driving dog and of the fan wheel.

FIG. 2 shows in a schematic view a cross section through the drive shaft 3, the driving dog 4 and the fan wheel 5 in the region of a contact region. A contact block 8 is formed on an outer side of the driving dog 4. An additional contact block 9, which is part of the fan wheel 5, bears on the contact block 8. The contact block 8 has a first contact surface 10 which bears on an additional contact surface 11 of the additional contact block 9. The contact surface 10, as seen in the axial direction of the drive shaft 3, is arranged at a first height h1 with regard to a center plane 12 of the driving dog 4. The additional contact surface 11 of the additional contact block 9 is arranged at a further height position h2 with regard to a second center plane 13 of the fan wheel 5. The center planes are arranged perpendicularly to the drive shaft 3.

For a reliable alignment, provision is made for three contact regions with a defined contact surface 10 of the driving dog 4 in each case and an associated defined additional contact surface 11 of the fan wheel 5. The three contact regions are spaced apart in this case preferably by an angle of 120° and lie on a circular line with regard to a center of the driving dog or of the fan wheel. Depending upon the selected embodiment, provision may also be made for more than three contact regions. Moreover, instead of a contact block 8, provision may also be made for an opening with a contact surface. In a further embodiment, instead of the additional contact block 9 an additional opening may also be formed in the fan wheel 5, in which an additional contact surface 11 is formed.

Figure 3:
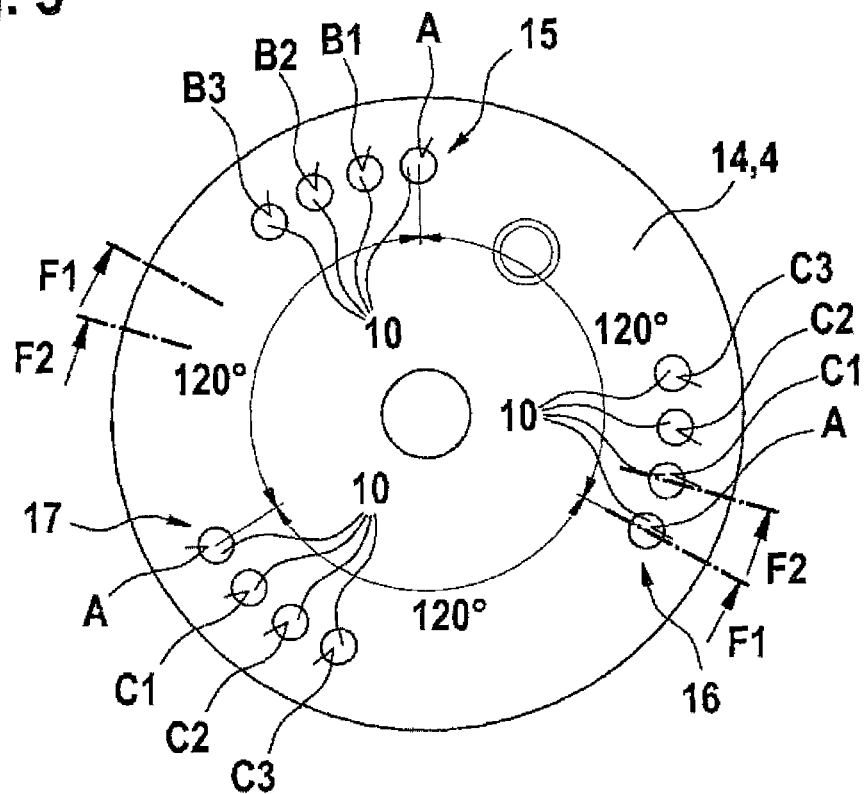
FIG. 3 shows a plan view of a driving dog.

FIG. 3 shows a schematic view of an outer side of the driving dog 4 which is associated with the fan hub 6 in the assembled state. On the front side 14, the driving dog 4 has three groups 15, 16, 17 of contact surfaces 10. In the depicted exemplary embodiment, each group has four contact surfaces 10. The contact surfaces 10 of the groups 15, 16, 17 are arranged on a circular ring with constant radius to the middle 21 of the driving dog. Moreover, the contact surfaces of a group have the same angular distance from each other in each case. Furthermore, the first, second, third and fourth contact surface of a group in each case, as seen in the counterclockwise direction, are arranged at a 120° angle to the first, second, third and fourth contact surface in each case, In the depicted exemplary embodiment, the first contact surface in each case has a height position $z_0$ with regard to the surface of the outer side of the driving dog 4. In the first group 15, the second, third and fourth contact surface B1, B2, B3, following in the clockwise direction, have a height position $z_n$ according to the following formula: $B_n: =z_n=z_0+n\times a$, wherein n can be a number from 1 to 10 and the parameter a can have a value of between 0.01 and 0.1 mm. Instead of the value range of 0.01 mm and 0.1 mm, the parameter a can also lie within a range of between 0.01 and 1 mm. The contact surfaces are identified by n in the sequence in the counterclockwise direction. The contact surface B1 has the height position $z_1=z_0+1\times a=z_0+a$.

In the second group 16, the second, third and fourth contact surface C1, C2, C3 have the following height position $z_n$ with regard to the surface of the outer side of the driving dog 4: $C_n=z_n=z_0-(n\times a)$. In the same way, the second, third and fourth contact surface C1, C2, C3, as seen in the counterclockwise direction, of the third group 17 have a height position which is determined by means of the index n and the following formula: $C_n$ has the height position $z_n=z_0(n\times a)$ in relation to the surface of the outer side of the driving dog 4.

The contact surface C1 therefore has the height position $z_1=z_0(1\times a)=z_0-a$. This means that the height positions of the contact surfaces of the first group 15 increase in steps in the counterclockwise direction. The height positions of the contact surfaces of the second and third groups 16, 17 decrease in steps in the counterclockwise direction. Depending upon the selected embodiment, the contact surfaces of the second and third groups 16, 17 also have different height positions. In particular, the second or third group 16, 17 can also have contact surfaces with height positions corresponding to those of the first group 15.

Figure 4:
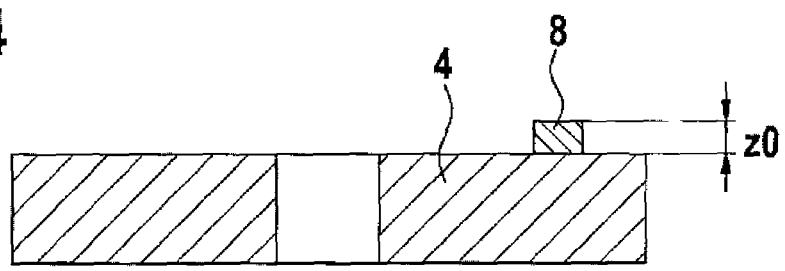
FIG. 4 shows a section F1 through a driving dog.

FIG. 4 shows a section F1 through a contact surface A which is arranged on a contact block 8 at a height position $z_0$ with regard to the surface of the driving dog 4.

Figure 5:
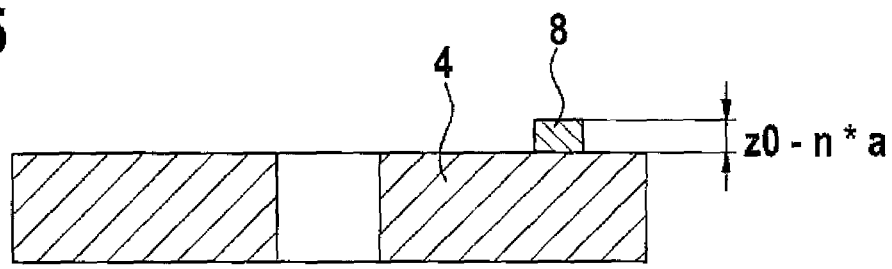
FIG. 5 shows a section F2 through the driving dog.

FIG. 5 shows a cross section through a contact surface C1 which is arranged on a contact block 8 at a height position $z_1=z_0(1\times a)=z_0-a$ with regard to the surface of the driving dog 4.

Figure 6:
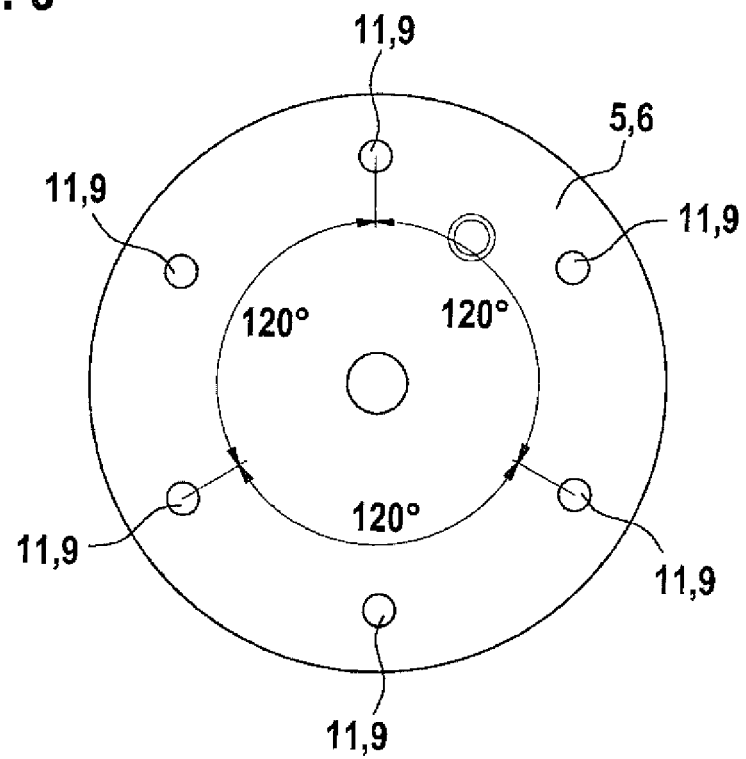
FIG. 6 shows a plan view of a fan wheel.

FIG. 6 shows a schematic view of the fan wheel 5 with six additional contact surfaces 11, wherein only the fan hub 6 is shown. Depending upon the selected embodiment, provision can also be made for only three additional contact surfaces 11 or multiples of three additional contact surfaces 11, wherein three additional contact surfaces 11 have an angular spacing of 120° in each case. In addition to the depicted exemplary embodiment, the six additional contact surfaces 11 of the fan wheel 5 in each case have an angular spacing of 60° from each other. The additional contact surfaces 11 may be formed on additional contact blocks 9 or in openings of the fan wheel 5. The depth of the openings in this case, however, must be less than the height of the lowest contact block 8 of the driving dog 4.

In the view of the driving dog 4 of FIG. 3, the three first contact surfaces 10 represent a first bearing position, the second contact surfaces B1, C1, C1 of the first, second and third groups 15, 16, 17 in each case represent a second bearing position, the third contact surfaces B2, C2, C2 in each case of the first, second and third groups 15, 16, 17 represent a third bearing position and the fourth contact surfaces B3, C3, C3 in each case of the first, second and third groups 15, 16, 17 in each case represent a fourth bearing position by which the driving dog 4 can be brought to bear on the corresponding additional contact surfaces 11 of the fan wheel 5.

Since in the selected exemplary embodiment the additional contact surfaces 11 are arranged at a standard height position and the contact surfaces of the first group 15 of the driving dog 4 increase in height position in the counterclockwise direction, wherein the contact surfaces of the second and third groups 16 and 17 decrease in height position in the counterclockwise direction, different inclined positions can be set regardless of whether which contact surface of the first, second and third groups 15, 16, 17 are used for bearing on the fan wheel 5.

Figure 7:
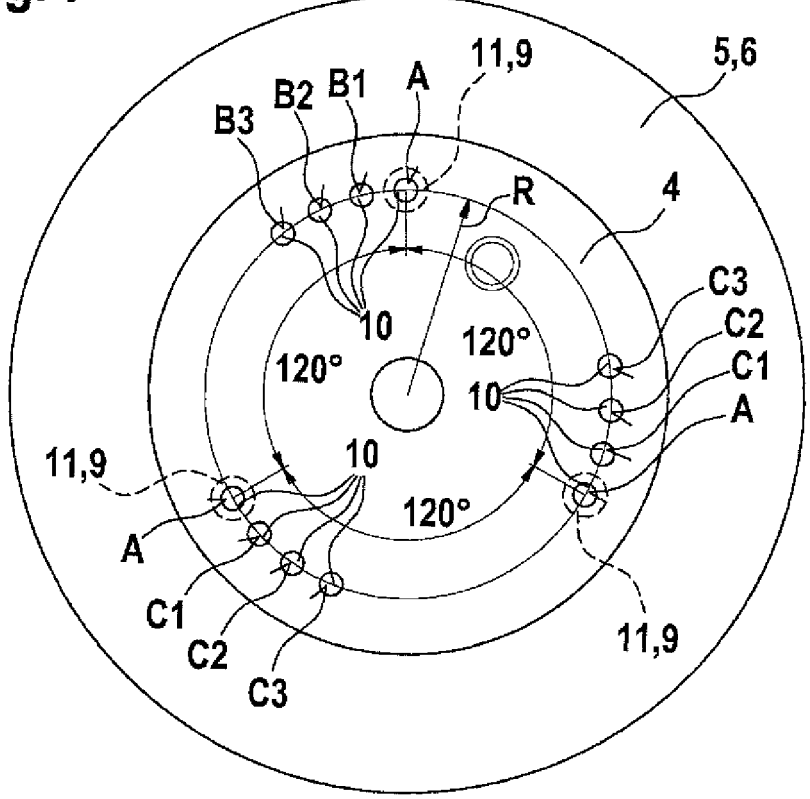
FIG. 7 shows a schematic view of the driving dog and of the fan wheel in a first angular position.

FIG. 7 shows a schematic view of an assembled fan, in which only the driving dog 4 and the fan hub 6 of the fan wheel 5 are shown. In FIG. 7, the fan wheel 5 is fastened on the driving dog 4 in a first angular position, wherein the fan wheel 5 has three additional contact surfaces 11 which bear on the three first contact surfaces A of the groups 15, 16, 17 of the driving dog 4. In this position, the fan wheel 5 is aligned parallel to the driving dog 4 since the additional contact surfaces 11 of the fan wheel 5 have the same height position with regard to a center plane of the fan wheel 5 and, moreover, the first contact surfaces A of the groups 15, 16, 17 of the driving dog 4 also have the same height position with regard to the center plane of the driving dog 4.

Figure 8:
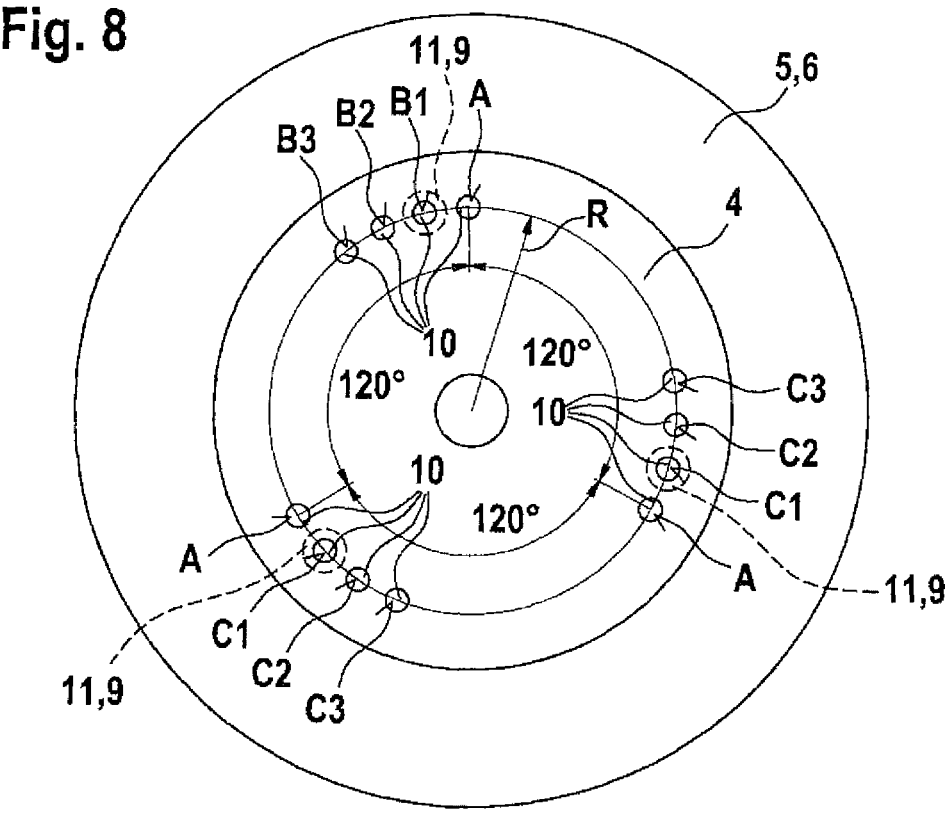
FIG. 8 shows a schematic view in a second angular position.

FIG. 8 shows a driving dog 4 and a fan wheel 5 of a fan 1, wherein the fan wheel 5 bears on the driving dog 4 in a second position and is fastened to the driving dog. In the second position, the three additional contact surfaces 11 of the fan wheel 5 are arranged on the second contact surfaces 10, B1, C1, C1 in each case, as seen in the counterclockwise direction, of the first, second and third groups 15, 16, 17 of the driving dog 4. The height position of the second contact surface B1 of the first group 15 of the driving dog 4 has the following height position: $z0+1 \times a = 0+a$. The height position of the second contact surface C1 of the second group 16 of the driving dog 4 has the height position $z0(1 \times a) = z0\ a$. Similarly, the second contact surface of the third group 16 of the driving dog 4 has the height position $z0-(1 \times a) = z0\ a$.

Therefore, a calculated inclined position between the driving dog 4 and the fan wheel 5 is set.

Figure 9:
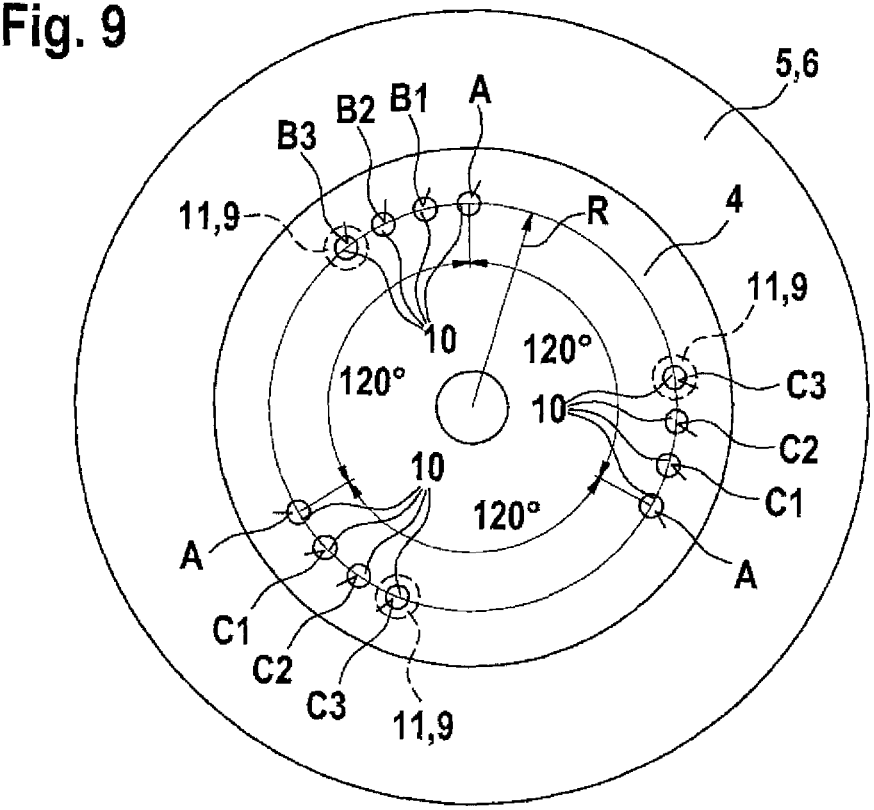
FIG. 9 shows a schematic view in a third angular position,
FIG. 10 schematically shows a finishing device for assembling the fan wheel on the driving dog.

FIG. 9 shows a schematic view of a fan wheel 5 and of a driving dog 4 of the fan 1 in a third angular position. In the third angular position, the additional contact surfaces 11 of the fan wheel 5 bear on the fourth contact surfaces B3, C3, C3 in each case, as seen in the counterclockwise direction, of the first, second and third groups 15, 16, 17 of the driving dog 4. In this third position, the fan wheel 5 is arranged in a manner in which it is tilted to an even greater degree in relation to the driving dog 4 than in the second position. This ensues because the height position of the fourth contact surface B3 of the first group 15 has the following height position: $z0+(3 \times a) = z0+3a$. Moreover, the fourth contact surfaces of the second and third groups 16, 17 of the driving dog 4 have the following height position: $z0-(3 \times a) = z0-3a$. Therefore, the distance between the fan wheel 5 and the driving dog 4 in the region of the contact surfaces of the second and third groups is less by the distance 6a than in the region of the fourth contact surface of the first group 15.

Therefore, by means of the depicted embodiments four angular positions which are inclined to a different degree can be created when assembling the driving dog with the fan wheel 5. A further variation, moreover, can be achieved by provision being made for not only three additional contact surfaces 11 on the fan wheel 5 but, for example, for six additional contact surfaces, as is shown in FIG. 6. Therefore, not only three additional contact surfaces 11 but six additional contact surfaces 11 are made available in order to set an optimum angular position between the fan wheel 5 and the driving dog 4 in which a preferred, preferably minimal unbalance exists.

The optimum angular position between the driving dog 4 and the fan wheel 5 is determined by all possible angular positions being tested and a resulting unbalance being measured. Final fastening of the fan wheel 5 on the driving dog 4 is then undertaken in the angular position in which the lowest unbalance is encountered. In this way, by means of a plurality of groups of contact surfaces with different height positions a calculated inclined position between the fan wheel 5 and the driving dog 4 can be set, with which an existing unbalance is compensated.

In the depicted exemplary embodiment, the groups of contact surfaces 10, arranged at different heights, are arranged on the driving dog 4. Depending upon the selected embodiment, the same groups of contact surfaces 10 with different height positions can also be formed on the fan wheel 5. In this way, the possibility of the combination of angular positions is additionally increased. Moreover, instead of the depicted exemplary embodiment, the groups of additional contact surfaces 10, arranged at different heights, can be arranged on the fan wheel 5 and the driving dog 4 can have contact surfaces 10 with the same height position, as is shown in the example of the fan wheel 5 of FIG. 4.

Figure 10:
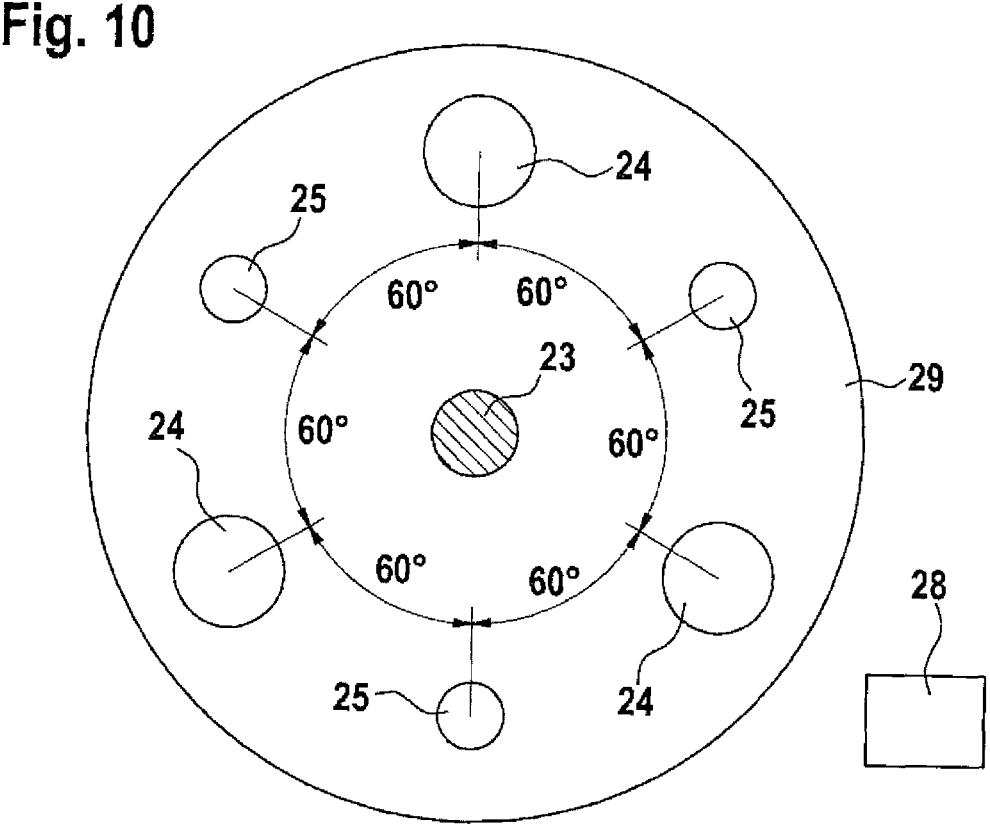

FIG. 10 shows an arrangement for testing and for assembling a driving dog 4 with a fan wheel 5. Thus, the arrangement has a baseplate with a centering bolt 23 which is guided through the center opening of the driving dog 4 and the center opening of the fan wheel 5. By means of three hydraulically operable fixing bolts 24, the fan wheel 5 is then pressed against the driving dog 4, wherein the fan wheel 5 bears by additional contact surfaces 11 on contact surfaces 10 of the driving dog 4 in a first angular position. Then, for example an axial eccentricity measurement is carried out in order to determine by means of a measuring system 28 the unbalance on the fixed angular position. For this, the arrangement with the fan wheel 5 is set in rotation and by means of the measuring system 28 the unbalance of the arrangement consisting of driving dog and fan wheel is determined by an axial eccentricity measurement. In a further angular position, the fan wheel 5 is then pressed against the driving dog 4 by means of the fixing bolt and an unbalance measured once again. In this way, the angular position in which the lowest unbalance occurs is determined. In this angular position, the fan wheel 5 is then fixedly connected to the driving dog 4, especially screw-fastened. For this, for example auto screw connections 25 are used.

The fixing bolt 24 may be operated by means of a hydraulic cylinder, for example.

Figure 11:
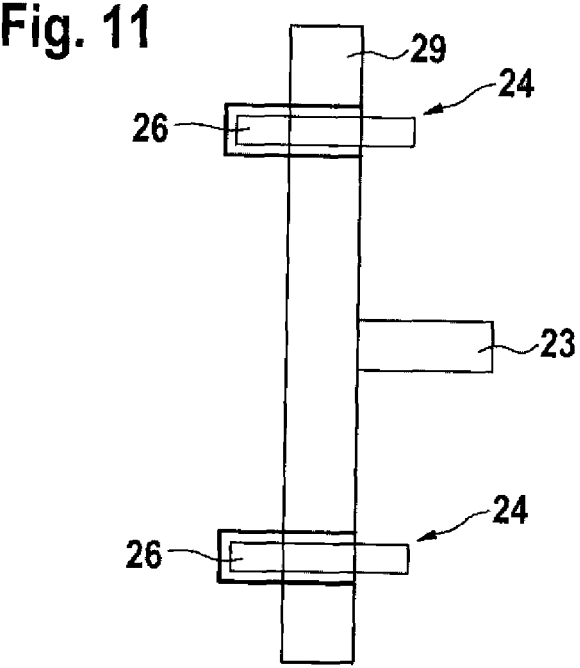
FIG. 11 shows a partial cross section through the finishing device.

FIG. 11 shows a cross section through a corresponding arrangement of a baseplate 29 with a centering bolt 23 and with fixing bolts 24 with hydraulic cylinders 26, with which a friction-resistant connection can be achieved between the driving dog 4 and the fan wheel 5 for measuring the unbalance.

The invention claimed is:

1. A fan (1) with a driving dog (4), wherein the driving dog (4) is connected to a fan wheel (5), wherein the driving dog (4) butts by a first number of contact surfaces (10) against additional contact surfaces (11) of the fan wheel, characterized in that at least one of the driving dog (4) and the fan wheel (5) has more than the first number of contact surfaces (10) or additional contact surfaces (11), wherein at least two contact surfaces (10) or additional contact surfaces (11) have different height positions with regard to a center plane or surface of the driving dog (4) or of the fan wheel (5).

2. The fan as claimed in claim 1, wherein the first number is three, wherein the three contact surfaces (10, 11) are arranged in an offset manner to a common center of the driving dog (4) at an angle of 120°.

3. The fan as claimed in claim 2, wherein at least some of the contact surfaces (10) of the driving dog (4) have different height positions, and wherein only some of the contact surfaces (10) of the driving dog (4) bear on additional contact surfaces (11) of the fan wheel (5).

4. The fan as claimed in claim 3, wherein some of the additional contact surfaces (11) of the fan wheel (5) have different height positions, and wherein only some of the additional contact surfaces (11) of the fan wheel (5) bear on contact surfaces (10) of the driving dog (4).

5. The fan as claimed in claim 4, wherein the driving dog has groups (15, 16, 17) of contact surfaces, wherein the groups (15, 16, 17) have fixed angular spacings with regard to a center of the driving dog (4), wherein each group (15, 16, 17) has a plurality of contact surfaces (A, B1, B2, B3; A, C1, C2, C3), wherein the contact surfaces of a group (15, 16, 17) are arranged in a row with fixed angular spacings with regard to the center of the driving dog (4), wherein the contact surfaces of the groups (15, 16, 17) are arranged at a fixed radial distance from the middle of the driving dog (4).

6. The fan as claimed in claim 5, wherein the fan wheel (5) has groups of contact surfaces, wherein the groups have fixed angular spacings with regard to a center of the fan wheel, wherein each group has a plurality of contact surfaces, wherein the contact surfaces of the groups are arranged in a row with fixed angular spacings with regard to the center of the fan wheel, wherein the contact surfaces of a group are arranged at a fixed radial distance from the middle of the fan wheel.

7. The fan as claimed in claim 6, wherein the contact surfaces (10, 11) of a group (15, 16, 17) have different height positions with regard to a center plane (12) of the driving dog (4) or to a center plane (13) of the fan wheel.

8. The fan as claimed in claim 5, wherein the contact surfaces (10, 11) of a group (15, 16, 17) have different height positions with regard to a center plane (12) of the driving dog (4) or to a center plane (13) of the fan wheel.

9. The fan as claimed in claim 1, wherein at least some of the contact surfaces (10) of the driving dog (4) have different height positions, and wherein only some of the contact surfaces (10) of the driving dog (4) bear on additional contact surfaces (11) of the fan wheel (5).

10. The fan as claimed in claim 1, wherein some of the additional contact surfaces (11) of the fan wheel (5) have different height positions, and wherein only some of the additional contact surfaces (11) of the fan wheel (5) bear on contact surfaces (10) of the driving dog (4).

11. The fan as claimed in claim 1, wherein the driving dog has groups (15, 16, 17) of contact surfaces, wherein the groups (15, 16, 17) have fixed angular spacings with regard to a center of the driving dog (4), wherein each group (15, 16, 17) has a plurality of contact surfaces (A, B1, B2, B3; A, C1, C2, C3), wherein the contact surfaces of a group (15, 16, 17) are arranged in a row with fixed angular spacings with regard to the center of the driving dog (4), wherein the contact surfaces of the groups (15, 16, 17) are arranged at a fixed radial distance from the middle of the driving dog (4).

12. The fan as claimed in claim 11, wherein the contact surfaces (10, 11) of a group (15, 16, 17) have different height positions with regard to a center plane (12) of the driving dog (4) or to a center plane (13) of the fan wheel.

13. The fan as claimed in claim 1, wherein the fan wheel (5) has groups of contact surfaces, wherein the groups have fixed angular spacings with regard to a center of the fan wheel, wherein each group has a plurality of contact surfaces, wherein the contact surfaces of the groups are arranged in a row with fixed angular spacings with regard to the center of the fan wheel, wherein the contact surfaces of a group are arranged at a fixed radial distance from the middle of the fan wheel.

14. The fan as claimed in claim 13, wherein the contact surfaces (10, 11) of a group (15, 16, 17) have different height positions with regard to a center plane (12) of the driving dog (4) or to a center plane (13) of the fan wheel.

15. A method for assembling a fan wheel (5) on a driving dog (4) of a fan (1), wherein the driving dog (4) and the fan wheel (5) have a plurality of contact surfaces (10, 11), wherein at least some of the contact surfaces (10, 11) have different height positions, and wherein at least some of the contact surfaces of the driving dog (4) are arranged symmetrically to some of the contact surfaces of the fan wheel (5), the method comprising:

pressing the driving dog (4) and the fan wheel (5) onto each other in a frictionally engaging manner in different angular positions, wherein in the different angular positions the driving dog (4) and the fan wheel (5), on account of the different heights of the contact surfaces, have different inclined positions;

measuring in the different angular positions a level for an unbalance of the fan wheel (5);

determining the angular position with a preferred unbalance; and fixedly connecting the driving dog (4) to the fan wheel (5) in the angular position with the preferred unbalance.

16. A device for implementing the method as claimed in claim 15, wherein the device comprises a fixing bolt which can be inserted into a center hole of the fan wheel (5) and of the driving dog (4) of the fan in order to center-symmetrically align the driving dog (4) and the fan wheel (5), a pressing-on means (24, 26) with which the fan wheel (5) can be pressed by additional contact surfaces (11) onto contact surfaces (10) of the driving dog (4), and a measuring system (28) with which an unbalance of the fan wheel (5) can be recorded when the fan wheel is set in motion.

17. The device as claimed in claim 16, wherein the pressing-on means has a plurality of fixing bolts (24) which press the fan wheel against the driving dog (4) in a plurality of positions.

18. The method of claim 15 wherein the preferred unbalance is a lowest unbalance.

* * * * *